April 9, 1968 R. E. MAYER 3,377,591
ANTENNA PATTERN CALIBRATOR
Filed April 18, 1967 2 Sheets-Sheet 1

FIG. I

Robert E. Mayer,
INVENTOR.

BY Harry M. Saragovitz
Edward J. Kelly
Herbert Berl
Aubrey J. Dunn

United States Patent Office 3,377,591
Patented Apr. 9, 1968

3,377,591
ANTENNA PATTERN CALIBRATOR
Robert E. Mayer, Glen Cove, N.Y., assignor, by mesne assignments, to the United States of America as represented by the Secretary of the Army
Filed Apr. 18, 1967, Ser. No. 632,167
9 Claims. (Cl. 343—100)

ABSTRACT OF THE DISCLOSURE

A calibration recording system for a test antenna rotating continuously in azimuth. An aircraft carrying a transmitter flies in a spiral about the test antenna and is continuously tracked by a track antenna. The output of the test antenna provides an amplitude input for a recorder, and the parallax-corrected aircraft azimuth from the track antenna provides marks for the recording when the test and track antenna have corresponding azimuths.

---

Figure 1:
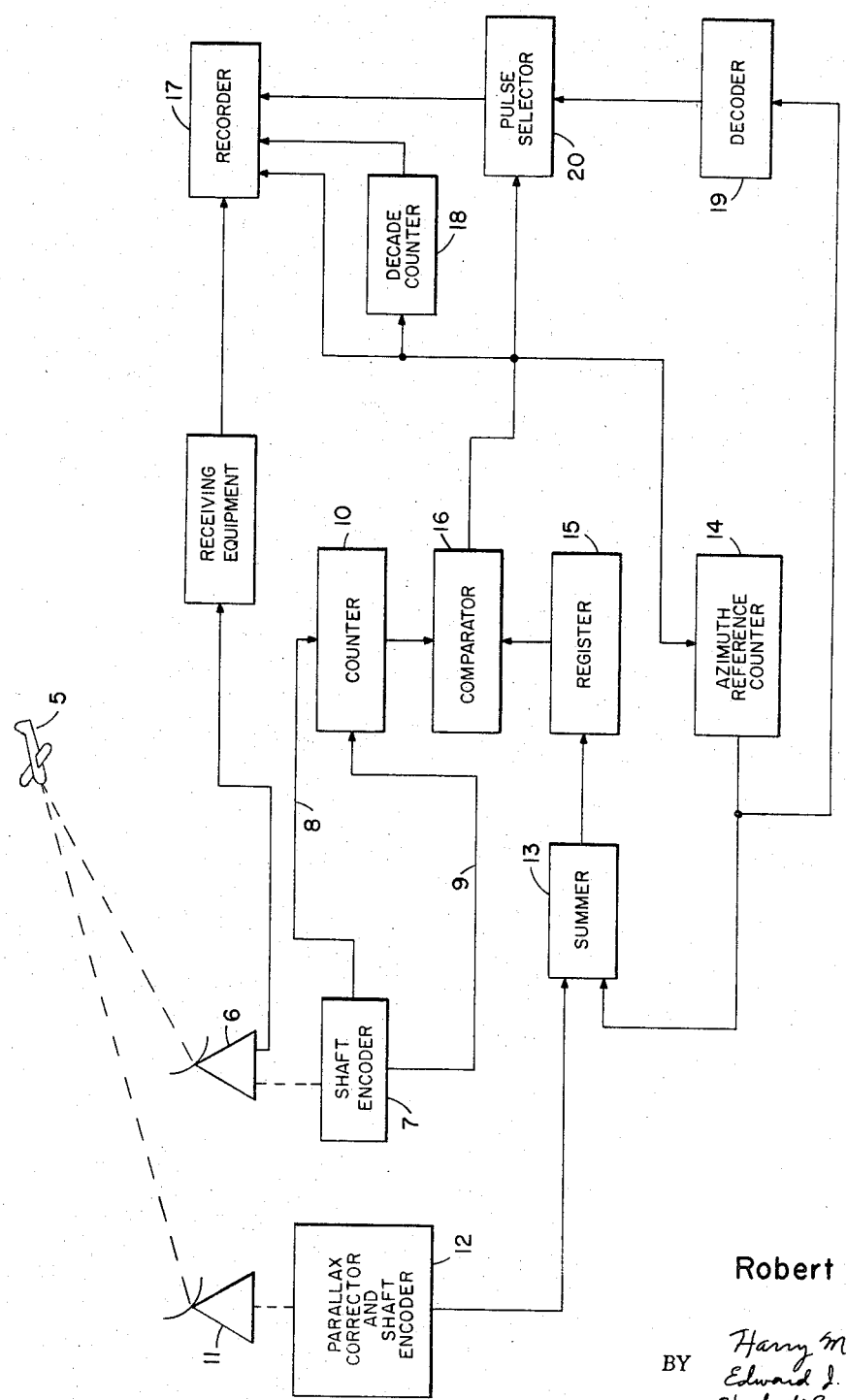

This invention is a system for efficiently and rapidly testing the antenna patterns of a large antenna. In particular, a radiating source separated a moderate distance from the antenna is continuously tracked by a tracking antenna, while the antenna whose pattern is to be determined continuously rotates in azimuth. The relative angular directions between the two antennas and the source are used as one axis of a two-dimensional recording, and the amplitude of the signal received by the antenna being tested is used as the other axis of the recording.

The determination of antenna patterns is well known in the art. One prior art showing is that in Section 15.8 of the book, "Microwave Antenna Theory and Design," which is volume 12 of the M.I.T. Radiation Laboratory Series. This book was edited by Samuel Silver and was published in 1949 by the McGraw-Hill Book Company, Inc.

In measuring antenna patterns, it is necessary to position the radiating source at a distance of approximately $2D^2\lambda$ from the antenna, where D is the antenna diameter, and $\lambda$ is the wavelength. For a large antenna and relatively short wavelength, this may require the source to be at a distance of 5,000 to 10,000 feet or more. If the antenna being tested can be positioned in both azimuth and elevation, satisfactory patterns may be obtained by using a source mounted on a nearby mountain, tower, or high building. However, if there is no nearby mountain, tower, or high building, or if the antenna cannot be positioned in elevation and is too large to be mounted on a test stand which can be positioned in elevation, it is necessary to use some form of airborne source, so that variable elevation angles may be obtained. In such a case, the position of the source must be measured and the patterns calibrated in terms of relative angle between the antenna space position and the source space position. This invention provides for continuously calibrating pattern records, as an aircraft containing a radiation source flies in a spiral course around the rotating test antenna.

The system of the invention has several advantages over known means of antenna pattern recording. One advantage is that the source need not be fixed on or supported by an elevated structure or mountain, but can be carried by an aircraft. Another advantage is that the antenna being tested need not be positioned in elevation.

The system of the invention employs a radiating source carried by an aircraft. The aircraft flies in a spiral pattern about the test antenna and a tracking antenna located adjacent the test antenna. The test antenna is continuously rotated in azimuth, while the track antenna continuously tracks the aircraft, and provides continuous azimuth and elevation data of the aircraft space position. This data is parallax-corrected so that it represents the aircraft position relative to the test antenna. As the test antenna rotates, its angular direction, with respect to the aircraft space position (as determined by the tracking antenna), is used as one axis of a recorder, and the amplitude output of the test antenna is used as the other axis of the recorder.

An object of this invention is to provide a novel system for testing the response pattern of an antenna.

Another object is to provide a system for testing the response pattern of an antenna in which readily available equipment is combined in a novel arrangement.

Figure 2:
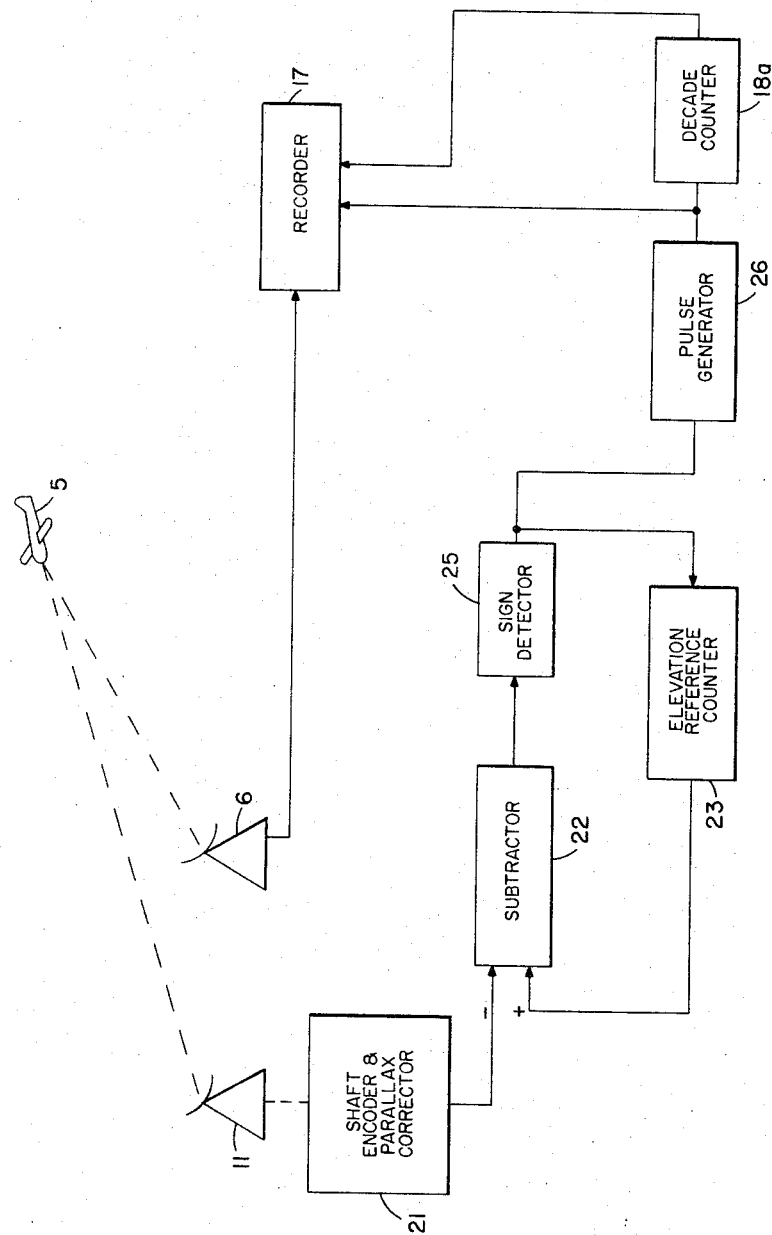

Theses objects, and others which may be obvious to one skilled in the art, may be realized by the invention as described hereinafter and may be better understood by reference to the drawing, in which:

FIGURE 1 shows a schematic diagram of one embodiment of the invention, for determining the azimuth pattern of an antenna, and FIGURE 2 shows a schematic diagram of another embodiment of the invention, for determining the elevation pattern of an antenna.

Referring now to FIGURE 1, an aircraft 5 is flown in a spiral path about the antenna being tested (hereinafter called test antenna). This antenna is designated 6, and is continuously rotated in azimuth. As the test antenna rotates, a shaft encoder 7 connected thereto produces synchronizing pulses at a point chosen as zero azimuth, and incremental pulses at regular azimuth increments. The synchronizing pulses are provided on line 8, and the incremental pulses on line 9. Encoder 7 could take any of the well-known forms, such as a perforated disk with a light on one side and photocells on the other side.

The encoder 7 provides incremental pulses at 0.05 milliradian increments. The synchronizing pulses from line 8 and the incremental pulses from line 9 are fed to counter 10. The synchronizing pulse resets counter 10 to zero at zero azimuth angle, so that as the counter counts incremental pulses, its count continuously represents the azimuth angle of test antenna 6. Counter 10 is any of the well-known digital counters.

Numeral 11 designates a tracking antenna which has a parallax corrector and digital shaft encoder 12 connected thereto. This parallax corrector and encoder 12 includes means to parallax correct the space information from antenna 11 to the space position of antenna 6. The output of 12 is sampled and added in summer 13, to the output of reference counter 14, to produce a digital sum. This sum is fed to register 15. The output of register 15 and the output of counter 10 are continuously compared in comparator 16. As counter 10 changes in increments of 0.05 milliradians, the comparator detects coincidence (equality) between the register output and the counter output and produces a coincidence pulse. The coincidence pulses are made to occur at exactly 1 milliradian intervals of azimuth angle of the source relative to the test antenna, as will be evident from the following description. Each time that a coincidence pulse occurs, it causes reference counter 14 to be advanced by 1 milliradian. Azimuth encoder 12 is then read, added to the reference counter output in summer 13, and fed to register 15. As the track antenna rotates, another coincidence pulse will be produced when the test antenna position again equals the sum of the track antenna azimuth position and reference counter. As the reference counter is continuously advanced in steps of 1 milliradian, the coincidence pulses are produced in increments of 1 milliradian. The pulses are fed to recorder 17 and produce calibration lines on the horizontal axis of the recording surface (paper or the like), at 1 milliradian increments.

The pulses from 16 are also fed to decade counter 18, which counts to ten and produces another pulse at increments of 10 mils. These pulses produce darker lines on the recording every tenth line.

To recognize special angles, such as azimuth zero and start and stop angles, decoder 19 is connected to the output of reference counter 14 and produces an output gate signal each time the reference counter output is the same as a prewired patch plug. The gate signal then selects the next coincidence pulse by pulse selector 20 and produces a single coincidence pulse which, thus, occurs at the preprogrammed angle. Any number of special angle functions can, therefore, be produced by prewiring several program plugs.

Reference may now be made to FIGURE 2, in which the same reference numerals are used for the same elements as shown in FIGURE 1. The operation of the invention for elevation calibration is similar to that for azimuth, except that test antenna 6 does not rotate in elevation. Therefore, calibration as a function of the parallax-corrected angle of the track antenna is desired. An elevation encoder 21 is connected to track antenna 11 and includes a parallax corrector. Encoder 21 is sampled at a high rate and is subtracted, in subtractor 22, from the output of elevation reference counter 23. The sign of the difference is detected in a sign detector 25. If the sign is +, it indicates that the elevation encoder is at a greater elevation angle than the reference counter, and a countup pulse is produced by means included in detector 25. This pulse increases the count in the reference by 1 milliradian. This then makes the sign negative (—), and no pulse is produced until the sign again changes to positive (+). The functions performed by element 25 can easily be performed by any number of known apparatuses, and does not constitute invention. The sequence of operations described above assumes that detector 25 is programmed for an increasing elevation angle spiral. If a decreasing angle spiral is used, the reference counter must count down in steps of 1 mil. In this way, the elevation pattern data is calibrated in 1 mil and 10 mil steps. Since the antenna is rotating continuously in azimuth, the elevation pattern data is generally produced by sampling the received signal at azimuth equals zero, or at other programmed azimuth angles. Detector 25 is connected to a pulse generator 26, which produces pulses to provide calibration lines on one axis of recorder 17. Decade counter 18a corresponds to counter 18 of FIGURE 1, and produces darker calibrating lines in recorder 17.

Each of the "boxes" of FIGURES 1 and 2 is known in the art, and the invention resides in the novel combination thereof.

I claim:

1. A system for determining the response pattern of a test antenna including: recording means connected to said test antenna for recording the amplitude of the output of said test antenna; a movable reference source; a track antenna for tracking said source; first means for providing aiming information of said test antenna; second means for providing aiming information of said track antenna; means for parallax correcting said information from said second means to correspond to the position of said test antenna; means for comparing the parallax-corrected information to the aiming information of said test antenna and for providing reference information to said recording means.

2. The system as defined in claim 1 wherein said first means for providing is a shaft-position indicator.

3. The system as defined in claim 1 wherein said second means for providing is a shaft-position indicator.

4. The system as defined in claim 1 wherein said means for comparing includes reference counter means; summing means connected to said means for parallax correcting and said counter means; register means connected to an output of said summing means; and coincidence means having inputs and an output, said register means and said second means for providing connected to separate inputs of said coincidence means, said output of said coincidence means connected to said recording means and said reference counter.

5. The system as defined in claim 3 wherein said means for comparing includes an elevation reference counter connected to said first means for providing; subtractor means having inputs and an output, with said counter and said second means connected to separate inputs of said subtractor; logic means connected to said output of said subtractor for determining the sign of said difference in said subtractor, and for providing an output in accord with said sign; pulse generating means having an input and an output, said logic means connected to the input of said pulse generating means and to said counter, and said output of said pulse generator connected to said recording means.

6. The system as defined in claim 5 further including counting means connected to said pulse generating means and to said recording means for providing additional reference information to said recording means.

7. The system as defined in claim 4 wherein said means for comparing and for providing includes decoder means having an input and an output; and pulse selector means having inputs and an output, said reference counter additionally connected to the input of said decoder means, said output of said decoder means and an output of said coincidence means connected to separate inputs of said pulse selector, and said output of said pulse selector connected to said recorder.

8. The system as defined in claim 1 wherein said reference source is elevated with respect to said antennas.

9. The system as defined in claim 7 wherein said reference source is elevated with respect to said antennas.

References Cited

UNITED STATES PATENTS 2,763,859  9/1956  Kuder _____ 343—100

RICHARD A. FARLEY, *Primary Examiner.*

R. E. BERGER, *Assistant Examiner.*